Patented Mar. 11, 1930

1,750,162

UNITED STATES PATENT OFFICE

JOHN H. DEPPELER, OF WEEHAWKEN, NEW JERSEY

THERMIT MIXTURE

No Drawing.  Application filed September 8, 1928.  Serial No. 304,794.

The invention relates to a novel thermit composition especially adapted for effecting combination fusion and pressure butt welds between relatively heavy rail sections and the like, the new composition involving the elimination of the usual mild steel additions to the thermit mixture commonly employed in rail welding operations of this character and the addition to the standard thermit mixture of about 15% of comminuted slag, preferably slag produced by the alumino-thermic reaction.

The alumino-thermic welding of rails as practiced abroad for the last twenty or more years was based on the Goldschmidt Reissue Patent No. 13,050, December 7, 1909, "process of joining metal pieces". This process consisted of the tapping of thermit steel and slag into a mold surrounding the ends of the rails to be welded in such a way that the thermit steel would fuse with the web and base of the rail, and the slag completely surround the head portion bringing it to a pressure welding heat, when the rails would be forced together by clamps, so that this combination of heat and pressure would thoroughly pressure weld the portions of the rail not already fusion welded by the molten metal.

In the United States, this method of welding rails has not been found as practical as that of the Lange Patent No. 1,153,435 of September 14, 1915, but recently in certain special work we have had occasion to resort to the old Goldschmidt process of the combination of fusion welding and pressure welding referred to above.

It is customary in all rail welding operations—whether the European system referred to above which for convenience we will call the "combined system with clamps", or by the Lange method, also referred to above, which we refer to as the "insert process"—to use thermit mixtures containing from 15% to 30% of mild steel punchings which tend to "temper" the thermit reaction and produce a greater amount of steel which, although it is naturally of a slightly lower temperature than that which would be produced from the thermit mixtures without these additions, nevertheless is of sufficiently high temperature to thoroughly weld the rail ends. In fact, this addition of mild steel punchings has been used in practically all thermits for welding purposes; that is, for locomotive, steel mill and marine welding work, as well as for rail welding.

In trying to apply this combined system rail weld with clamps to the American rail sections, we have encountered considerable difficulty; first, because the American rails are heavier than those used abroad, the T rail—for instance—weighing 130 lbs. per yard as against 100 lbs. per yard (the heaviest European T rail section) and, further, because of the difference in hardness of the rails caused by the carbon content, the European rails containing only about .40 carbon whereas the American sections contain at least double this. Now, in the welding of this heavier and higher carbon T rail, we have found it important to keep the thermit steel below the level of the head of the rail because where it is allowed to touch the head of the rail cracks appear in the high carbon steel at the upper level of the thermit steel weld and these cracks make these joints unsafe for use as the joints might easily fail in service. Now, it is of course a comparatively simple matter to design the annular space in the molds surrounding the joint so that the steel level will be always kept below the head of the rail, but at the same time there must be sufficient alumino-thermic slag to completely surround the head of the rail and in such quantity as to provide sufficient heat to enable these heads to butt weld to each other by pressure when the clamps are operated to force the rail heads together. This can, of course, be accomplished by using amounts of thermit necessary to produce these large amounts of alumino-thermic slag but these larger amounts of thermit will then produce more than enough steel to properly weld the web and base portions of the rail sections.

Now, I have discovered that for the economical welding by this combined system with clamps, I can cause the necessary "tempering" of the thermit reaction and at the same time produce much more economically the proper proportions of steel and slag in the thermit reaction so that there will be just sufficient steel to properly fusion weld the web and bases of the rails and at the same time a relatively large amount of slag to completely surround the upper portion and heads of the rails and supply the necessary heat for pressure welding the same by a new composition of thermit mixture which has heretofore never been used and which would not be economical for ordinary purposes. In this thermit mixture, I substitute a percentage of ground slag for the former percentage of mild steel punchings. In other words, where formerly, say, 15% of mild steel punchings had been added to the thermit to "temper" the reaction and increase the yield of molten steel, I now find it desirable for this combined system welding operation with clamps to substitute for the 15% mild steel punchings—about 15% ground alumino-thermic slag; and in this way to yield by reaction a proportion of steel and slag much more suitable for this combined system welding.

The advantage of this is much greater than is at first supposed because it enables the fusion welding of the base and web to be done with a small amount of thermit steel properly distributed, a larger amount not only being less economical but also introducing strains, cleavage planes and other defects which tend to weaken this fusion part of the combined system weld; the other advantage being, of course, that the whole weld can be accomplished in a much more economical manner with much smaller thermit portions than would be required by the present methods.

What I claim is:

1. A thermit mixture for alumino-thermic welding including ground slag.

2. A thermit mixture for alumino-thermic welding including ground alumino-thermic slag.

3. A thermit mixture for alumino-thermic welding including approximately 15% of ground slag.

In testimony whereof I affix my signature.

JOHN H. DEPPELER.